United States Patent [19]

Rost

[11] 4,214,940
[45] Jul. 29, 1980

[54] WRAPPING-OVER DEVICE FOR A TIRE ASSEMBLY DRUM

[75] Inventor: Harry Rost, Munich, Fed. Rep. of Germany

[73] Assignee: Metzeler Kautshuk AG, Munich, Fed. Rep. of Germany

[21] Appl. No.: 906,618

[22] Filed: May 16, 1978

Related U.S. Application Data

[63] Continuation of Ser. No. 802,525, Jun. 1, 1977, abandoned.

[51] Int. Cl.² ............................................. B29H 17/22
[52] U.S. Cl. ...................................... 156/402; 156/132
[58] Field of Search ............... 156/123 R, 132, 394 R, 156/398, 400–402, 408–411, 421

[56] References Cited

U.S. PATENT DOCUMENTS

| | | | |
|---|---|---|---|
| 1,379,277 | 5/1921 | Morris | 156/402 |
| 1,760,929 | 6/1930 | Wikle | 156/402 |
| 3,616,060 | 10/1971 | Askam et al. | 156/402 |
| 3,794,542 | 2/1974 | Colombani et al. | 156/132 |
| 3,873,397 | 3/1975 | Leblond et al. | 156/400 |

FOREIGN PATENT DOCUMENTS 1286745  1/1969  Fed. Rep. of Germany ............ 156/397

Primary Examiner—John E. Kittle
Attorney, Agent, or Firm—Armstrong, Nikaido, Marmelstein & Kubovcik

[57] ABSTRACT

A wrapping over device for use with a rotatable solid body tire assembly drum. The wrapping over device includes an arcuate support having at least three conical finger elements mounted thereon. The finger elements are positioned progressively closer to an axial centerline of the tire assembly drum in a direction of rotation of the drum. A pressing roller is rotatably mounted on the support at a position between the conical fingers. A pivot drive pivotally mounts the support for rotation about an axis disposed at right angles to the assembly drum axial centerline. A parallel drive means mounts the pivot drive means for movement in a direction parallel to the tire assembly drum axial centerline.

16 Claims, 9 Drawing Figures

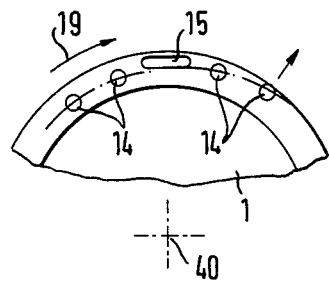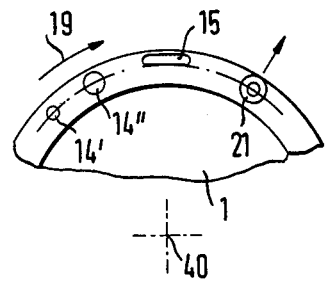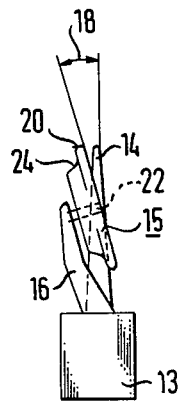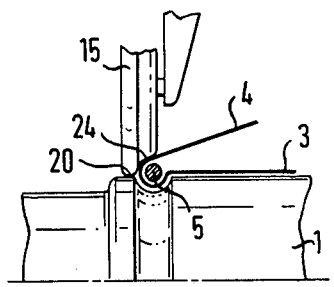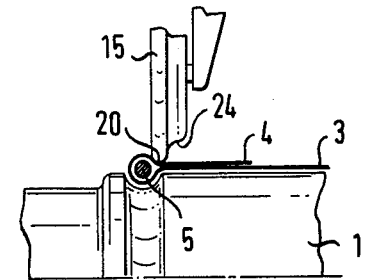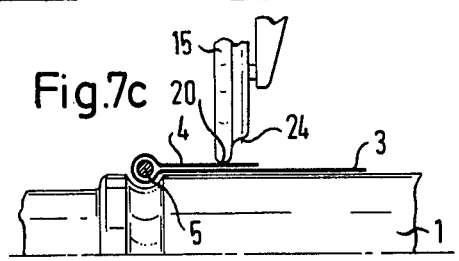

WRAPPING-OVER DEVICE FOR A TIRE ASSEMBLY DRUM

This is a continuation of application Ser. No. 802,525, filed June 1, 1977, now abandoned.

BACKGROUND OF THE INVENTION

1. Field of the Invention

The present invention relates to a wrapping-over device for a tire assembly drum, more particularly, for a solid steel tire body assembly drum, by means of which the edges of the body material projecting over the bead can be folded over the bead when the drum is expanded and then pressed in position.

2. Description of the Prior Art

The operation of wrapping over the edges of the body material is one of the most time-consuming processes in the construction of solid steel bodies. This wrapping over operation is generally carried out using special tire tools which the mechanic manually holds under the edge and by forcefully pulling upwards he gradually wraps the edge about the bead. As this edge is very resistant and tends to yield, pressure rollers can only be applied when the edge has already been largely folded over. A generally known wrapping over tool consists of a handle on which a conical finger element is rotatably mounted.

Bellows wrapping devices are also known. These are fixedly incorporated in the tire assembly drum. As the bellows are inflated they roll the edges of the body material over the bead. However, bellows wrapping systems are only suitable for tire assembly drums wherein the wrapping bellows can be located directly behind the bead mounting. Accordingly, this type of drum is either only suitable for one tire size or the bead mountings must be axially adjustable. Bellows wrapping systems also require a large amount of operating space. As the feed elements of the servicer must be brought as close as possible to the drum surface for accurate positioning of the individual layers of cord material, the servicer station must in this case always be retracted from the assembly drum in a separate operation.

SUMMARY OF THE INVENTION

The object of the present invention is to provide a wrapping-over device of the type described initially with which the projecting body edges can be reliably and accurately folded over by mechanical means. The wrapping-over device is also designed to be adaptable to the most varied body widths and strengths. The device according to the invention should also enable the body edge to be carefully folded over and simultaneously pressed into position.

This problem is solved in that a plurality of conical finger elements and a plate-shaped presser roller are rotatably mounted along an arcuate section in each support, the extended axis of rotation of the fingers meeting at a common point; in that the support is displaceable via a pivot drive and is pivotally mounted about an axis disposed at right angles to the longitudinal axis of the drum; and in that the pivot drive is displaceable parallel to the longitudinal axis of the drum. This wrapping-over device which is installed immediately adjacent to both edges of the body assembly drum wraps the body material in a careful and reliable manner about the bead and simultaneously presses the body edges in position.

Another important feature according to the invention is that the plate-shaped presser roller is rotatably mounted on a bracket and the bracket is disposed between the finger elements on the support. It is also advantageous for the plane of the plate-shaped presser roller to be obliquely inclined with respect to the two adjacent finger elements and its circumference—when the fingers are disposed at right angles to the longitudinal axis of the drum—projects anteriorly beyond the tips of the finger elements. The presser roller back up the wrapping process and, as a result of its special position, reliably presses against the body edge. The distance between its forward circumferential edge and the tips of the finger elements ensures that these cannot come into etching engagement with the sensitive cord material. During the wrapping-over operation the edge of the body material continually tends to slip beneath the finger elements acting on the same. As a result, it is important that the finger element in the direction of rotation should exert the greatest expanding force on the same to ensure that the first finger of the wrapping-over device will be able to slip beneath the edge when it is again delivered to the wrapping-over device after another rotation. Accordingly, the finger elements are spaced increasingly further from the longitudinal axis of the drum in the direction of rotation of the same. Alternatively, they may have increasingly large diameters in the direction of rotation of the drum.

In a special embodiment, the last finger element in the direction of rotation of the drum has a conical shape. As a result, the edge of the cord material is considerably expanded, thereby preventing if from slipping beneath the first finger during the subsequent rotation.

Considerable protection is afforded the edge of the body to be folded over by the fact that the radius of the arcuate line on which the pivot bearing points of the fingers are disposed corresponds generally to the radius of the drum. As a result, the relative speeds of the surfaces of the fingers and of the rotating body edge are very low.

In another embodiment of the wrapping-over device the plane of the plate-shaped presser roller is inclined by 5°–15°, and preferably 8°–10, with respect to the adjacent finger elements. As a result, the leading roller edge is disposed above the finger tips in the case of the fingers which are disposed generally parallel to the circumference of the drum, while the trailing roller edge and the largest part of the lateral face is meridionally disposed beneath the finger elements. As a result, only a relatively small part of the surface of the presser roller presses on the body edge. Damage to the body material as a result of excessive etching force is thereby avoided. The inclined position of the presser roller also renders it more effective when it is rolled against the body.

During the wrapping over and pressing operations it is important that the wrapping-over device should be able to follow exactly the contour of the body material, particularly in the region of the bead. The forces exerted by the presser roller facilitating the rolling operation should also be transmitted. In another embodiment of the invention this is achieved in that the support is displaceably guided in a yoke and the presser roller is acted on by a work cylinder generally in the direction of its plane, this work cylinder being hinged between the yoke and the bracket and controlling the movements of the support. The yoke is advantageously displaceably mounted on a supporting arm. This work cylinder presses the presser roller, and thus the support, against the body material with a pressure corresponding to the particular work zone of the presser roller.

In an advantageous embodiment of the invention the edge of the presser roller has a rounded shape and adjoins a circumferential groove towards the middle of the upper side of the roller. The rounded edge of the presser roller contributes to a satisfactory pressing operation while the groove is synchronized with the bead zone of the body and is designed to press the body material exactly on the bead. The body edge is thus preformed for the future pressing operation.

In the wrapping-over device according to the invention the finger elements and presser roller advantageously consist of high-grade steel and are mounted via roller bearings or needle bearings. A non-stick surface coating prevents excessive adhesion to the adhesive cord material and reduces friction between the surfaces working in contact with one another.

Especially good performances of the wrapping-over device are obtained when its effective zone extends over approximately a quarter of the circumference of the drum.

To prevent air pockets from forming between the glued surfaces of the body material during the pressing operation, a first work cylinder with its pressing direction directed at right angles to the longitudinal axis of the drum is hinged on the pivot drive, the adjustment of this work cylinder being determined by a stop. In this way, irregularities can easily be balanced and the stop ensures that the tips of the wrapping fingers do not rub against the surface of the tire body.

The wrapping-over device according to the invention is particularly suitable for mass producing different tires of uniform quality requiring short work cycles. It is designed to perform longitudinal and pivoting movements and pressing movements towards and against the product. These movements are superimposed on one another and individually controlled. The work pressures of the work cylinders can be controlled independently of one another.

The wrapping over operations are preferably carried out simultaneously on both edges of the tire body. This is achieved with the wrapping-over device according to the invention by providing a wrapping-over device for each of the edge zones of the drum. The wrapping-over devices are symmetrically disposed with respect to one another and are displaceable on a shaft comprising oppositely directed thread sections.

The movements and work pressures of the wrapping-over device are preferably punch card controlled. This control method saves time-consuming conversion operations when it is necessary to change one body size for another as it is merely necessary in this case to insert in the control device the work program for the desired body size in the form of a punch card.

According to another independent feature of the invention the edge zones of the drum are graduated with respect to the drum circumference so as to form a free space. This configuration of the edge of the drum provides ready access to the wrapping-over device according to the invention.

The wrapping-over device according to the invention does not necessitate any special type of drum structure. It can also be used with drums of very simple construction, for example, those which are converted to different tire sizes by using different inserts in readily interchangeable bead tension bands.

BRIEF DESCRIPTION OF THE DRAWING

The invention will be described in further detail with reference to the accompanying drawings, in which:

FIG. 4 is a diagrammatic view of the wrapping-over device

FIG. 5 is a different diagrammatic view from that of FIG. 4;

FIG. 6 shows the disposition of thie presser roller;

FIG. 7a, b and c show three stage of the wrapping operation.

DESCRIPTION OF THE PREFERRED EMBODIMENTS

Figure 1:
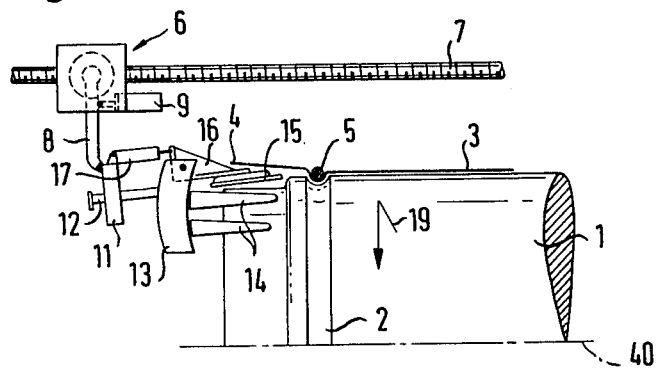
FIG. 1 is a plan view of a part of a tire body assembly drum with a wrapping-over device disposed laterally behind the same.
Figure 2:
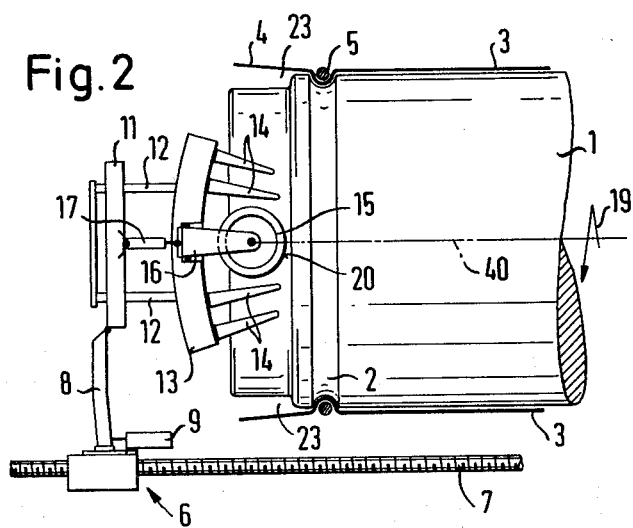
FIG. 2 is a side view of a wrapping over device.

In FIGS. 1 and 2 reference 1 designates a part of a tire assembly drum, more specifically a solid steel tire body assembly drum. An annular groove 2 is provided in the region of the edge. One layer of a strip of body material 3 is disposed on the drum 1. The strip 3 is constricted by a bead 5 in the region of the groove 2. The subsequent bead of the tire body is to be formed about the bead 5 in the region of the groove 2. As a result of the constricting bead 5 the projecting edge 4 of the body material is raised slightly with respect to the end of the drum 1. At the end of the drum edge is a shelf forming a free space 23 beneath the drum edge. A wrapping-over device can be made to operate in this space 23.

The wrapping-over device consists of a pivot drive 6 which is displaceable on a shaft 7 mounted parallel to the longitudinal axis 40 of the drum. The pivot drive 6 comprises a supporting arm 8 which is radially movable towards the drum 1 together with its pivot drive system by means of a first work cylinder 9 pressing the entire device radially against the drum. The supporting arm 8 bears a yoke 11 in which a support 13 is displaceably mounted in the pressing direction of the presser roller 15 via a guide 12. The support 13 is spatially curved in two planes and bears on its front side conical, rotatably mounted finger elements 14 and a central bracket 16 comprising a presser roller 15 which projects between the finger elements. A second work cylinder 17 is hinged both on the yoke 11 and on the bracket 16 of the presser roller 15. It operates generally in the direction of the plane of the presser roller 15 and simultaneously controls the movement of the support 13 in the yoke 11. The arrow 19 indicates the direction of rotation of the drum 1. Reference 40 designates the longitudinal axis of the drum.

As shown in FIG. 2, the finger elements 14 have a conical shape and extend to a differing extent into the space 23. The presser roller 15 is disposed therebetween and its forward edge 20 ends at the line formed by the finger tips, resp., slightly beyond the same. The finger elements 14 and the presser roller 15 advantageously consist of a high-grade steel and are provided with a non-stick coating. The presser roller 15 is obliquely inclined with respect to the adjacent fingers.

Figure 3:
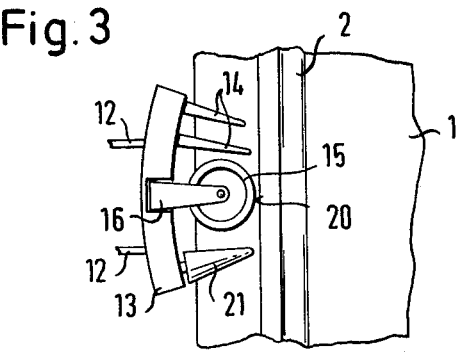
FIG. 3 is another embodiment of a wrapping-over device as shown in FIG. 2.

FIG. 3 shows a support 13 in which an individual conical finger element 21 is provided in place of the two last fingers in the direction of rotation of the drum.

FIG. 4 is a diagrammatic view of the position of the finger elements 14 with respect to the circumference of the drum. The wrapping-over device is located in the starting position shown in FIGS. 1 and 2. In order to produce powerful expansion forces in the edge of the body material to be folded over, the individual finger elements 14 are arranged on a curved line in the direction of rotation of the drum (arrow 19) at increasingly large intervals from the longitudinal axis 40 of the drum. As a result, the last finger element 14 in the direction of rotation of the drum exerts the maximum expanding force on the edge 4 of the body material. This prevents the edge 4 of the body material from slipping beneath the first finger when it returns to this spot.

FIG. 5 shows how this measure is accomplished in different ways. In this embodiment the individual fingers 14', 14" and the conical finger element 21 are mounted on a common arc disposed concentrically with respect to the circumference of the drum. They possess increasingly large outer diameters in the direction of rotation of the drum whereby the edge of the body material is again prevented from slipping beneath the same. The front edge 20 of the presser roller 15 has no influence on the wrapping over operation.

FIG. 6 shows the position of the presser roller 15 in relation to the adjacent finger elements 14. The presser roller 15 is supported by a bracket 16 which is inclinedly mounted on the support 13. It comprises a pivot 22 about which the presser roller 15 is rotatably mounted. The angle of the pivot 22 is adjustable with respect to the bracket 16. The plane of the presser roller 15 is inclined with respect to the adjacent finger elements by an angle 18 (approximately 5°-15° and preferably 8°-10°). The forward edge 20 of the presser roller 15 thus projects beyond the tips of the finger elements 14 while its near edge retreats behind the finger elements 14. The outer edge of the presser roller 15 has a rounded shape. On the upper side of the presser roller 15 a groove 24 adjoins this rounded surface. This groove 24 facilitates the rolling process in the region of the bead.

In the pressing stage shown in FIG. 7a the operation of folding over the edge of body material has been largely concluded. In this position of the wrapping-over device the presser roller 15 rests with its groove 24 on the bead 5 and presses the body edge 4 exactly into the desired contour.

In the position shown in FIG. 7b the wrapping-over device has been moved further over the tire assembly drum and presses the body edge 4 with the rounded surface of the presser roller 15 into a groove directly behind the bead 5.

FIG. 7c shows the final stage of the rolling operation in which the presser roller 15 has completely pressed down the body edge 4. During these three stages of the rolling-on operation the second work cylinder 17 (FIGS. 1 and 2) exerts pressing force and the first work cylinder 9 reinforces the latter by pressing the presser roller on the surface of the drum 1.

A control system ensures that the wrapping-over device spends more time in particularly exposed parts of the wrapping over operation and the presser roller 15 then completes a plurality of rolling revolutions as this point. The pressing pressure exerted by the work cylinders 17 and 9 is preferably simultaneously increased at this point.

Similarly, the superimposed movements of the pivot drive on the shaft 7 and of the support arm 8 are synchronized in such a way that sudden movements of the engaged finger elements and of the presser roller cannot occur.

Thus, the longitudinal pivoting and pressing movements on and against the tire body are superimposed on one another and are individually controllable. For example, the work cylinders 9 and 17 are controllable independently of one another.

A wrapping-over device is provided on each side of the drum 1 to enable the wrapping over and presing operations to take place in synchronism on both sides of the body under construction. These two symmetrically operating wrapping-over devices are driven in common by the shaft 7 which is provided with oppositely directed thread sections. The distance between the pivot point of the pivot drive 6 and of the shaft 7 extending parallel to the drum axis 40 varies during the wrapping over operation but this variation is compensated by the first work cylinder 9.

The embodiments which have been represented only represent a selection of a large number of possible variants. Wrapping-over devices according to the present invention can obviously be provided with more than four finger elements which if necessary, may also be displaced during the wrapping over operation in order to adjust as far as possible in every position to the circumferential speed of the body edge currently being processed.

What is claimed is:

1. A wrapping over device for a rotatable solid body tire assembly drum having an axial centerline for wrapping over the tire body edges projecting beyond a bead when the assembly drum is expanded and pressed in position, said wrapping over device comprising:
   an arcuate support;
   at least three conical finger means mounted on said support and defining a curve, and each of said conical finger means being positioned in the direction of rotation of the tire assembly drum, closer to the tire assembly drum axial center line for applying an increased pressure on said tire body projecting edge in the direction of rotation, an extension of said finger means meeting at a common point wherein each successive said finger means exert an increasing force on the body edges;
   a plate shaped pressing roller rotatably mounted on said support at a position between said conical finger means;
   a pivot drive means pivotally mounting said support for rotation about an axis disposed at right angles to the assembly drum axial centerline, said pivot drive means including a first work cylinder for pivoting said support about said axis at right angles at the assembly drum; and
   parallel drive means mounting said pivot drive means for movement in a direction parallel to the tire assembly drum axial centerline.

2. A wrapping-over device as claimed in claim 1, characterized in that the plate-shaped presser roller is rotatably mounted on a bracket (16) and the bracket (16) is disposed between the finger means on the support (13).

3. A wrapping-over device as claimed in claim 2, characterized in that the plane of the plate-shaped presser roller is obliquely inclined with respect to the two adjacent finger means and its circumference projects forwardly beyond the tips of the finger when the finger are disposed at right angles to the longitudinal axis of the drum.

4. A wrapping-over device as claimed in claim 3, characterized in that the plane of the plate-shaped presser roller is inclined with respect to the adjacent finger means by between 5° and 15° and preferably 8° and 10° such that when the finger means are disposed generally parallel to the circumference of the drum the front edge of the roller projects beyond the tips of the finger while the rear roller edge and the largest part of the lateral face is beneath the finger.

5. A wrapping-over device as claimed in claim 1, characterized in that the diameters of the finger means, increase in the direction of rotation of the drum.

6. A wrapping-over device as claimed in claim 5, characterized in that the last finger means in the direction of rotation of the drum has a conical shape.

7. A wrapping-over device as claimed in claim 6, characterized in that the radius of the arc of the pivot points of the finger means corresponds generally to the radius of the drum.

8. A wrapping-over device as claimed in claim 1, characterized in that the support is displaceably guided in a yoke and the presser roller is acted on by a second work cylinder generally in the direction of its plane, this work cylinder being hinged between the yoke and the bracket and controlling the movement of the support (13) in the yoke.

9. A wrapping-over device as claimed in claim 8, characterized in that the yoke is displaceably mounted on a support arm.

10. A wrapping-over device as claimed in claim 1, characterized in that the edge of the presser roller has a rounded shape and it is adjoined towards the middle of the upper side of the roller by a circumferential groove.

11. A wrapping-over device as claimed in claim 1, characterized in that the finer means and the pressing roller are made of high-grade steel and are mounted via roller bearings or needle bearings.

12. A wrapping-over device as claimed in claim 1, characterized in that the finger means and the presser roller are provided with non-stick surface coatings.

13. A wrapping-over device as claimed in claim 1, characterized in that its effective zone extends approximately over a quarter of the surface of the drum.

14. A wrapping-over device as claimed in claim 1, characterized in that said first work cylinder has its pressing direction directed at right angles to the longitudinal axis of the drum and is hinged on the pivot drive, the adjustment of the first work cylinder being limited by a stop.

15. A wrapping-over device as claimed in claim 1, characterized in that a wrapping-over device is provided for opposite edges of the drum and the two wrapping-over devices are symmetrically disposed with respect to one another on a shaft comprising oppositely directed thread sections.

16. A wrapping-over device, more particularly, as claimed in claim 1, characterized in that the edge zones of the drum are graduated with respect to the circumference of the drum, thereby forming a free space (23).

* * * * *